United States Patent
Harai

(10) Patent No.: US 11,247,668 B2
(45) Date of Patent: Feb. 15, 2022

(54) VEHICLE CONTROL DEVICE AND VEHICLE CONTROL METHOD

(71) Applicant: HITACHI AUTOMOTIVE SYSTEMS, LTD., Hitachinaka (JP)

(72) Inventor: Tatsunori Harai, Tokyo (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 256 days.

(21) Appl. No.: 16/465,823

(22) PCT Filed: Mar. 2, 2018

(86) PCT No.: PCT/JP2018/007936
§ 371 (c)(1),
(2) Date: May 31, 2019

(87) PCT Pub. No.: WO2018/168513
PCT Pub. Date: Sep. 20, 2018

(65) Prior Publication Data
US 2019/0299980 A1    Oct. 3, 2019

(30) Foreign Application Priority Data

Mar. 15, 2017 (JP) .............................. JP2017-049325

(51) Int. Cl.
*B60W 30/08*    (2012.01)
*B60G 17/016*    (2006.01)
(Continued)

(52) U.S. Cl.
CPC ......... *B60W 30/08* (2013.01); *B60G 17/0164* (2013.01); *B60W 30/18* (2013.01);
(Continued)

(58) Field of Classification Search
None
See application file for complete search history.

(56) References Cited

U.S. PATENT DOCUMENTS

| | | | |
|---|---|---|---|
| 7,173,391 B2 * | 2/2007 | Jones ................... | G05D 1/0219 318/568.12 |
| 9,487,139 B1 * | 11/2016 | Ishida ................... | B60W 30/08 |

(Continued)

FOREIGN PATENT DOCUMENTS

| | | |
|---|---|---|
| JP | 2006-182108 A | 7/2006 |
| JP | 2009-061795 A | 3/2009 |

(Continued)

OTHER PUBLICATIONS

Extended European Search report issued in European Patent Application No. 18768627.4 dated Nov. 24, 2020, (4 pages).

(Continued)

*Primary Examiner* — Adam R Mott
*Assistant Examiner* — Tischi Balachandra
(74) *Attorney, Agent, or Firm* — Foley & Lardner LLP

(57) ABSTRACT

The present invention makes it possible to appropriately grasp a stop cause when a vehicle stops. An ECU 5, which controls a vehicle including wheels and a vehicle body connected to the wheels includes: a wheel stop detection unit 138 that detects a stop of the wheels; a vehicle body stop detection unit 133 that detects a stop of the vehicle body; and a stop cause determination unit 141 that determines a stop cause of the vehicle based on a stop timing of the wheels detected by the wheel stop detection unit 138 and a stop timing of the vehicle body detected by the vehicle body stop detection unit 133. The stop cause determination unit 141 may determine that the stop cause is contact of the vehicle body with an obstacle when the stop timing of the vehicle body is earlier than the stop timing of the wheels.

11 Claims, 11 Drawing Sheets

(51) Int. Cl.
*B60W 40/02* (2006.01)
*B60W 40/105* (2012.01)
*B60W 50/14* (2020.01)
*B60W 30/18* (2012.01)
*B60W 40/10* (2012.01)

(52) U.S. Cl.
CPC ............ *B60W 40/02* (2013.01); *B60W 40/10* (2013.01); *B60W 40/105* (2013.01); *B60W 50/14* (2013.01); *B60W 2420/42* (2013.01); *B60W 2510/18* (2013.01); *B60W 2520/04* (2013.01); *B60W 2520/28* (2013.01); *B60W 2710/226* (2013.01)

(56) References Cited

U.S. PATENT DOCUMENTS

| | | | | |
|---|---|---|---|---|
| 9,873,432 | B2* | 1/2018 | Naito | B60W 10/184 |
| 10,029,681 | B2* | 7/2018 | Suzuki | B60C 19/00 |
| 10,192,444 | B2* | 1/2019 | Park | B60W 50/14 |
| 2004/0034461 | A1* | 2/2004 | Kadota | B60W 20/00 701/67 |
| 2007/0213892 | A1* | 9/2007 | Jones | G05D 1/0227 701/23 |
| 2007/0285041 | A1* | 12/2007 | Jones | G05D 1/0227 318/568.12 |
| 2009/0091093 | A1* | 4/2009 | Urababa | B60G 17/0162 280/5.511 |
| 2011/0022284 | A1* | 1/2011 | Umakoshi | B60W 50/06 701/70 |
| 2012/0143456 | A1* | 6/2012 | Ueda | B60W 40/06 701/93 |
| 2012/0150406 | A1* | 6/2012 | Tomura | B60W 30/18018 701/70 |
| 2013/0253731 | A1* | 9/2013 | Kanou | B60T 7/12 701/1 |
| 2013/0311023 | A1* | 11/2013 | Nozaki | B60W 10/08 701/22 |
| 2014/0136039 | A1* | 5/2014 | Tanishima | B60L 15/2054 701/22 |
| 2014/0309902 | A1* | 10/2014 | Katsuyama | B60K 7/0007 701/70 |
| 2015/0166074 | A1* | 6/2015 | Inomata | B60W 40/10 701/1 |
| 2015/0375746 | A1* | 12/2015 | Naito | B60W 10/08 701/70 |
| 2016/0069675 | A1* | 3/2016 | Bando | G01B 21/00 701/519 |
| 2016/0214604 | A1* | 7/2016 | Kida | B60T 7/22 |
| 2016/0272180 | A1* | 9/2016 | Morimura | B60T 8/885 |
| 2016/0332569 | A1* | 11/2016 | Ishida | B60W 30/08 |
| 2017/0080927 | A1* | 3/2017 | Suzuki | B60W 50/12 |
| 2017/0177005 | A1* | 6/2017 | Morey | B62D 55/06 |
| 2017/0277184 | A1* | 9/2017 | Fujimura | B60W 10/20 |
| 2018/0075749 | A1* | 3/2018 | Park | B60W 40/02 |
| 2018/0118197 | A1* | 5/2018 | Kim | B60W 30/06 |
| 2018/0141461 | A1* | 5/2018 | Sano | B60W 30/18127 |
| 2018/0141535 | A1* | 5/2018 | Yoshioka | B60W 10/30 |
| 2018/0141553 | A1* | 5/2018 | Katayama | B60W 10/20 |
| 2018/0181121 | A1* | 6/2018 | Min | G05D 1/0061 |
| 2018/0281799 | A1* | 10/2018 | Kawamoto | F16H 61/0031 |
| 2019/0210600 | A1* | 7/2019 | Etori | B60R 21/00 |
| 2020/0039546 | A1* | 2/2020 | Angel | B61L 25/023 |

FOREIGN PATENT DOCUMENTS

| | | |
|---|---|---|
| JP | 2013-049389 A | 3/2013 |
| JP | 2013-154760 A | 8/2013 |
| JP | 2015-120398 A | 7/2015 |

OTHER PUBLICATIONS

International Search Report with English translation and Written Opinion issued in corresponding application No. PCT/JP2018/007936 dated Jun. 26, 2018.

* cited by examiner

VEHICLE CONTROL DEVICE AND VEHICLE CONTROL METHOD

TECHNICAL FIELD

The present invention relates to a vehicle control device and the like for controlling a vehicle including wheels and a vehicle body connected to the wheels.

BACKGROUND ART

In recent years, techniques for automating movement of a vehicle and assisting driver's operations with respect to the vehicle have been actively developed. It is important to properly grasp surrounding states of the vehicle and a relationship between the vehicle and the surroundings in order to automate the movement of the vehicle and to assist the driver's operations.

For example, PTL 1 discloses a technique for detecting passage of a step and controlling a driving force when guiding or parking a vehicle so as to suppress generation of a sudden speed change.

In addition, PTL 2 discloses a technique for measuring a relative distance between an obstacle and a vehicle using a combination of a stereo camera or a monocular camera and a distance measurement device such as a laser and detecting a collision between the obstacle and the vehicle.

CITATION LIST

Patent Literature

PTL 1: JP 2013-49389 A
PTL 2: JP 2015-120398 A

SUMMARY OF INVENTION

Technical Problem

For example, in the case of automating movement of a vehicle or in the case of assisting an operation, it is required to detect obstacles around the vehicle to control or assist the vehicle so as not to come into contact with the obstacles.

However, it is difficult to grasp all the obstacles around the vehicle and completely prevent the contact with the obstacles. For example, when an obstacle is detected using a video image of a camera, it is difficult to detect an obstacle in a blind spot of the camera. It is necessary to arrange a lot of cameras or the like in order to eliminate such a blind spot of the camera, which requires extremely high cost. In addition, even when a plurality of cameras is arranged to eliminate blind spots in front, rear, left, and right directions of the vehicle, it is difficult to prevent the contact with obstacles below the vehicle.

In this manner, it is difficult to grasp all the obstacles around the vehicle and perform control so as to prevent contact with the vehicle and perform assistance so as to prevent the contact, and thus, there is also a risk that the vehicle may come into contact with the obstacle or the like and stop. When the vehicle comes into contact with the obstacle and stops in this manner, it is difficult to identify a cause of the stop of the vehicle unless the relationship between the vehicle and the obstacle can be grasped.

In addition, as the contact with the obstacle that causes the vehicle to stop, a vehicle body itself of the vehicle comes into contact with the obstacle in some cases or a wheel comes into contact with the obstacle in other cases so that it is difficult to grasp which one is the stop cause.

Further, a countermeasure (control, assistance, or the like) that needs to be taken after the stop may differ depending on the stop cause of the vehicle, and thus, there is a risk that it is difficult to take the countermeasure after the stop or take an incorrect countermeasure unless the stop cause of the vehicle can be grasped.

The present invention has been made in view of the above-described circumstances, and an object thereof is to provide a technique capable of appropriately grasping a cause of a stop when a vehicle stops.

Solution to Problem

In order to achieve the above-described object, a vehicle control device according to one aspect is a vehicle control device, which controls a vehicle comprising wheels and a vehicle body connected to the wheels, including: a wheel stop detection unit that detects a stop of the wheels; a vehicle body stop detection unit that detects a stop of the vehicle body; and a stop cause determination unit that determines a stop cause of the vehicle based on a stop timing of the wheels detected by the wheel stop detection unit and a stop timing of the vehicle body detected by the vehicle body stop detection unit.

Advantageous Effects of Invention

According to the present invention, it is possible to appropriately grasp the cause of the stop when the vehicle stops.

DESCRIPTION OF EMBODIMENTS

An embodiment will be described with reference to the drawings. Incidentally, the embodiment to be described hereinafter does not limit the invention according to the claims, and further, all of the elements described in the embodiment and combinations thereof are not necessarily indispensable for the solution of the invention.

[Configuration of Vehicle]

Figure 1:
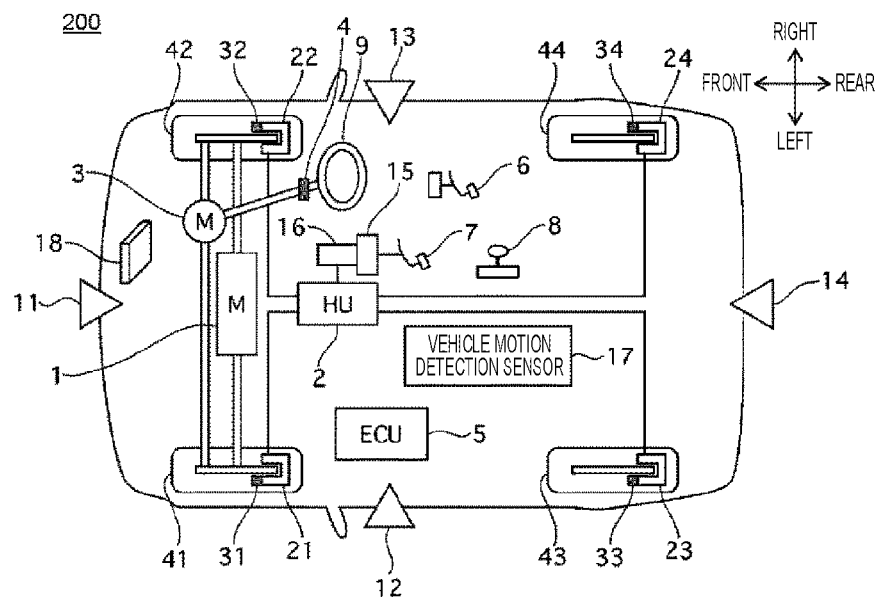
FIG. 1 is an overall configuration diagram of a vehicle including a vehicle control device according to one embodiment.

FIG. 1 is an overall configuration diagram of a vehicle including a vehicle control device according to one embodiment.

A vehicle 200 includes: wheels 41 to 44; a drive motor 1, which is an example of a drive source that generates a driving force for driving driven wheels (wheels 41 and 42 in the example of FIG. 1) among the wheels 41 to 44; an accelerator pedal 6 that allows a driver to operate an accelerator; a brake pedal 7 that allows the driver to operate a brake; a shift lever 8 that switches an operation (forward movement, backward movement, stop, or the like) of the vehicle 200; a steering wheel 9 configured to allow the driver to steer steered wheels (the wheels 41 and 42 in the example of FIG. 1); a steering motor 3 that generates power for steering the steered wheels; wheel cylinders 21 to 24 that are provided to correspond to the respective wheels 41 to 44 and actuate brakes; a brake booster 15 that boosts a depressing force of the brake pedal 7; a master cylinder 16 that generates a pressure corresponding to a pressing force applied by the brake booster 15 in brake oil; a brake actuator 2 that incorporates a motor-driven pump, a solenoid valve, and the like therein and controls supply of the brake oil to the wheel cylinders 21 to 24; an electronic control unit (ECU) 5, which is an example of a vehicle control device that integrally controls the respective parts of the vehicle 200; and a touch panel 18 that displays information for the driver and receives an operation input from the driver.

In addition, the vehicle 200 is provided with sensors that acquire various kinds of information.

For example, the vehicle 200 includes wheel speed sensors 31 to 34 that measure wheel speeds of the respective wheels 41 to 44; a vehicle motion detection sensor 17 that detects a longitudinal acceleration, a lateral acceleration, and a yaw rate of the vehicle 200; a steering angle sensor 4 that detects a steering angle; an accelerator pedal sensor (not illustrated) that detects an operation amount of the accelerator pedal 6; a brake pedal sensor (not illustrated) that detects an operation amount of the brake pedal 7; a shift position detection sensor (not illustrated) that detects a shift position of the shift lever 8; and a steering torque sensor that detects a steering torque with respect to the steered wheels. Sensor values from the various sensors are input to the ECU 5. The wheel speed sensors 31 to 34 generate, for example, a plurality of wheel speed pulses per rotation of the wheel.

The vehicle 200 according to the present embodiment can be not only driven in response to driver's operation but also automatically driven by control of the ECU 5 regardless of the driver's operation.

For example, the driver can adjust the driving force of the drive motor 1 by instructing the forward or backward movement of the vehicle 200 using the shift lever 8 and operating the accelerator pedal 6. In addition, the driving force of the drive motor 1 can be also controlled by the control of the ECU 5 regardless of the accelerator pedal operation and the shift operation performed by the driver.

In addition, the driver can control a braking force in the vehicle 200 by operating the brake pedal 7. In addition, the ECU 5 can also control the braking force of the vehicle 200 regardless of the operation of the brake pedal 7 performed by the driver.

Specifically, when the driver operates the brake pedal 7, the depressing force of the driver with respect to the brake pedal 7 is boosted by the brake booster 15, and a hydraulic pressure corresponding to the force is generated in the master cylinder 16. The generated hydraulic pressure is supplied to the wheel cylinders 21 to 24 via the brake actuator 2 so that braking forces are generated by the brakes provided on the respective wheels 41 to 44.

In addition, with the control of the brake actuator 2 performed by the ECU 5 in the vehicle 200, the hydraulic pressure of the brake oil supplied to the wheel cylinders 21 to 24 can be independently controlled and the braking forces of the four wheels can be independently controlled regardless of the operation of the brake pedal 7 performed by the driver. Incidentally, in the vehicle 200 according to the present embodiment, the hydraulic pressure supplied to the wheel cylinders 21 to 24 by the operation of the brake pedal 7 performed by the driver has no difference between the left and right wheels, and there is no difference in braking force between the left and right wheels.

In addition, the left and right front wheels (steered wheels) 41 and 42 of the vehicle 200 can be steered as the driver operates the steering wheel 9, and the left and right front wheels (steered wheels) 41 and 42 can be also steered as the ECU 5 controls the steering motor 3 regardless of the driver's steering operation.

Specifically, when the driver operates the steering wheel 9, the steering motor 3 generates an assist torque in response to a steering torque input by the driver via the steering wheel 9, and the left and right front wheels (steered wheels) 41 and 42 are steered by the steering torque generated by the driver and the assist torque. As a result, the vehicle 200 turns in response to the steering amount of the steered wheels if the vehicle 200 is in the middle of traveling.

In addition, the steering torque is generated in the vehicle 200 as the ECU 5 controls the steering motor 3 regardless of the operation of the steering wheel 9 performed by the driver so that the left and right front wheels 41, 42 are steered.

In addition, cameras 11 to 14, which are examples of an imaging device that captures an image in each direction, are arranged on a front side, a left side, a right side, and a rear side of the vehicle 200. Video images (images) captured by the four cameras 11 to 14 are combined, for example, by the ECU 5 as an overhead-view video image obtained by looking down the vehicle 200 and the periphery thereof from above, and the combined vide is displayed on the touch panel 18. The driver can perform parking by his/her own operation while watching the overhead-view video image regardless of parking assistance control of the vehicle 200.

The ECU 5 of the vehicle 200 has a function of performing the parking assistance control, recognizes a parking position based on a parking frame on the video images of the cameras 11 to 14 and positions of other parked vehicles, and controls the drive motor 1, the brake actuator 2, the steering motor 3, and the like such that the vehicle 200 reaches the recognized parking position. At this time, the ECU 5 may recognize the parking position based on driver's instruction on the overhead-view video image displayed on the touch panel 18.

The ECU 5 identifies a position of the vehicle based on sensor values of the steering angle sensor 4 and the wheel speed sensors 31 to 34, and controls a parking route at the time of assisting parking. In addition, the ECU 5 performs the brake actuator 2 based on sensor signals from the vehicle motion detection sensor 17, the steering angle sensor 4, and the wheel speed sensors 31 to 34 to perform anti-slip control and anti-lock brake control of the vehicle 200.

Incidentally, the above-described function of the ECU 5 may be realized by providing a plurality of electronic control units and communicating necessary information among the electronic control units.

[Configuration Relating to Parking Assistance Control]

Figure 2:
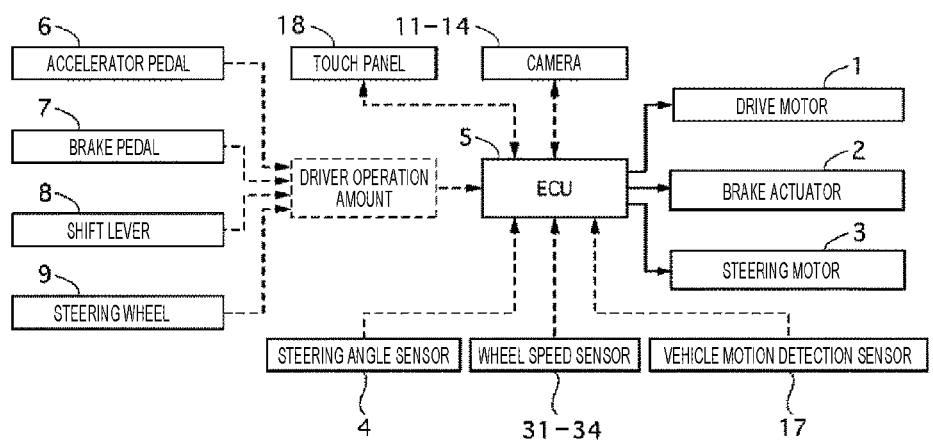
FIG. 2 is a diagram illustrating a configuration relating to parking assistance control in the vehicle according to the embodiment.

FIG. 2 is a diagram illustrating a configuration relating to the parking assistance control in the vehicle according to the embodiment.

The ECU 5 of the vehicle 200 controls the drive motor 1, the brake actuator 2, the steering motor 3, and the like during a parking operation (automatic parking operation) performed by the parking assistance control.

During the parking operation, the ECU 5 acquires information on the amount of the operation performed by the driver from various sensors, and can receive an override input by the driver.

For example, when the driver operates the brake pedal 7, the ECU 5 performs control to temporarily stop the vehicle 200. As a result, when an obstacle has entered the parking route, the driver's braking operation is prioritized so that contact with the obstacle can be avoided.

In addition, when the driver has released the operation of the brake pedal 7 thereafter, the ECU 5 resumes the automatic parking operation. As a result, the vehicle 200 can automatically resume the automatic parking operation when the obstacle has been away from the parking route.

In addition, when the driver changes the shift position or the steering torque generated by the driver becomes equal to or greater than a predetermined value, the ECU 5 stops the automatic parking operation. As a result, the vehicle 200 can be made to travel while prioritizing the shift operation or steering operation performed by the driver. Incidentally, an automatic control stop button may be displayed on the touch panel 18 so that the ECU 5 stops the automatic driving operation when the driver presses the automatic control stop button.

[Parking Assistance Control]

Figure 3:
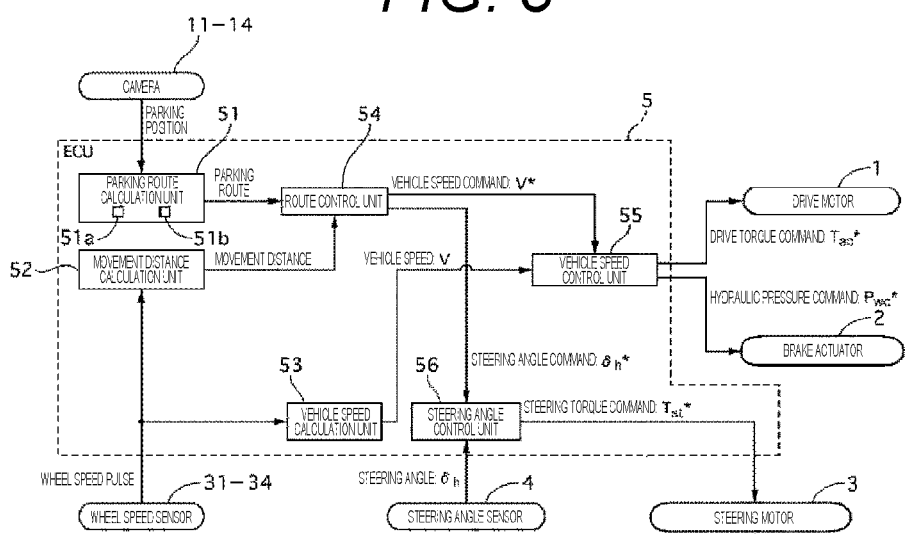
FIG. 3 is a functional configuration diagram relating to the parking assistance control in the vehicle according to the embodiment.

FIG. 3 is a functional configuration diagram relating to the parking assistance control in the vehicle according to the embodiment.

The ECU 5 includes, as a functional configuration that realizes the parking assistance control, a parking route calculation unit 51, a movement distance calculation unit 52, a vehicle speed calculation unit 53, a route control unit 54, a vehicle speed control unit 55, and a steering angle control unit 56.

The parking route calculation unit 51 recognizes a parking position of the vehicle 200 based on images of the cameras 11 to 14 at a parking operation start position. Incidentally, the parking position may be recognized by driver's designation on the touch panel 18 on which the overhead-view video image is displayed.

The parking route calculation unit 51 calculates a parking route for parking at the recognized parking position.

The movement distance calculation unit 52 integrates the number of generation times of wheel speed pulses generated from the wheel speed sensors 31 to 34, and calculates a movement distance of the vehicle 200.

The vehicle speed calculation unit 53 calculates a vehicle speed V of the vehicle 200 using a generation cycle of the wheel speed pulse generated from the wheel speed sensors 31 to 34. For example, when assuming the movement distance and the vehicle speed V of the vehicle 200 as a movement distance and a vehicle speed at the center of a rear axle, average values of movement distances and wheel speeds of the left and right rear wheels (the wheels 43 and 44) are used, respectively, as the movement distance and the vehicle speed V to be obtained.

The route control unit 54 obtains a vehicle speed command (a target value of a vehicle speed) V* and a steering angle command (a target value of a steering angle) δh* from the parking route calculated by the parking route calculation unit 51 and the movement distance of the vehicle 200 calculated by the movement distance calculation unit 52. Incidentally, the vehicle speed command V* during each of forward movement and backward movement during the parking operation is, for example, constant.

The vehicle speed control unit 55 performs vehicle speed control based on the vehicle speed command V* and the vehicle speed V. Specifically, the vehicle speed control unit 55 obtains a driving torque command Tac* for the drive motor 1 and a hydraulic pressure command Pwc* for the brake actuator 2, as operation amounts, based on the vehicle speed command V* and the vehicle speed V, transmits the obtained driving torque command Tac* to the drive motor 1, and transmits the obtained hydraulic pressure command Pwc* to the brake actuator 2. The drive motor 1 generates a driving force according to the received driving torque command Tac*. In addition, the brake actuator 2 generates a braking force by generating a hydraulic pressure according to the received hydraulic pressure command Pwc*. Incidentally, the example in which the braking force is generated only by controlling the brake actuator 2 is illustrated in this example, but the vehicle speed control unit 55 may control the drive motor 1 and the brake actuator 2 to generate a braking force, for example, when the drive motor 1 is operated as a generator and used as a brake, that is, when the drive motor 1 is used as a regenerative brake.

The steering angle control unit 56 performs steering angle control based on the steering angle command δh* and a steering angle δh measured by the steering angle sensor 4. Specifically, the steering angle control unit 56 obtains a steering torque command Tst* as an operation amount, and outputs the steering torque command Tst* to the steering motor 3. The steering motor 3 generates a steering torque according to the steering torque command Tst*.

[Vehicle Speed Control]

Figure 4:
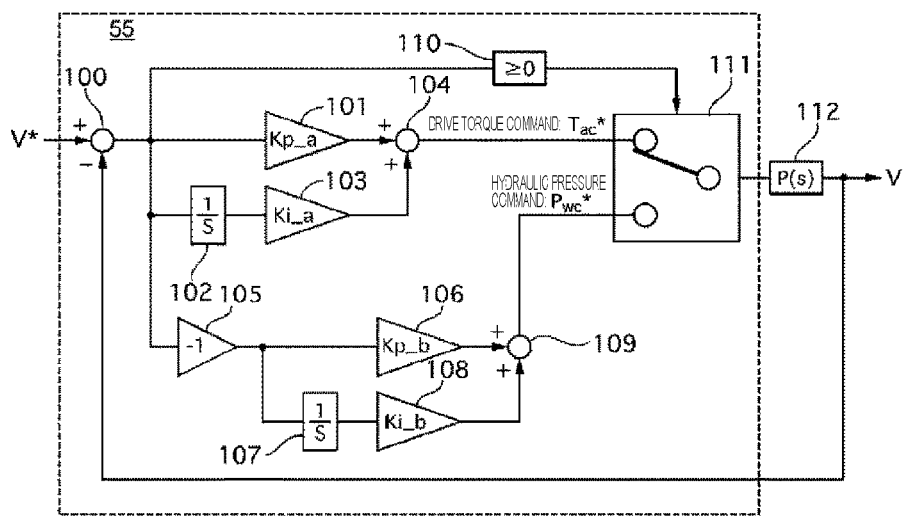
FIG. 4 is a configuration diagram of a vehicle speed control unit according to the embodiment.

FIG. 4 is a configuration diagram of the vehicle speed control unit according to the embodiment.

The vehicle speed control unit 55 includes a subtractor 100, a multiplier 101, an integrator 102, a multiplier 103, an adder 104, a multiplier 105, and a multiplier 106, an integrator 107, a multiplier 108, an adder 109, a determiner 110, and a switch 111.

The subtractor 100 outputs a vehicle speed deviation (V*−V) obtained by subtracting the vehicle speed V (the vehicle speed V input from vehicle speed calculation unit 53) of a plant model (a vehicle model: the vehicle 200 herein) 112 from the vehicle speed command V* input from the route control unit 54. The multiplier 101 multiplies the vehicle speed deviation (V*−V) input from the subtractor 100 by a proportional gain Kp_a and outputs the result. The integrator 102 outputs an integrated value obtained by integrating the vehicle speed deviation (V*−V) input from the subtractor 100.

The multiplier 103 multiplies the integrated value of the vehicle speed deviations obtained by the integrator 102 by an integral gain Ki_a and outputs the result. The adder 104 outputs a sum of the input value from the multiplier 101 and the input value from the multiplier 103 as the driving torque command Tac*. The multiplier 105 inverts a positive or negative sign of the vehicle speed deviation input from the subtractor 100 and outputs the result. The multiplier 106 multiplies the vehicle speed deviation whose sign has been inverted and input from the multiplier 105 by a proportional gain Kp_b, and outputs the result. The integrator 107 integrates the vehicle speed deviation whose sign has been inverted and input from the multiplier 105 and outputs the result. The multiplier 108 multiplies the integrated value of the deviation whose sign has been inverted and input from the multiplier 105 by an integral gain Ki_b and outputs the result. The adder 109 outputs a sum of the input value from the multiplier 106 and the input value from the multiplier 108 as the hydraulic pressure command Pwc*. The determiner 110 outputs a link driving selection command=1 (true) when the vehicle speed deviation input from the subtractor 100 is zero or larger, and outputs the link driving selection command=0 (false) when the vehicle speed deviation is smaller than zero. The switch 111 outputs the driving torque command Tac* when the link driving selection command input from the determiner 110 is one, and outputs the hydraulic pressure command Pwc* when the link driving selection command is zero.

When the driving torque command Tac* is input to the plant model 112, the drive motor 1 generates a driving force according to the driving torque command Tac*. When the hydraulic pressure command Pwc* is input, the brake actuator 2 controls the hydraulic pressure of the brake oil supplied to the wheel cylinders 21 to 24 to be the hydraulic pressure according to the hydraulic pressure command Pwc* to generate a predetermined braking force. The vehicle speed V of the vehicle 200 is calculated by the vehicle speed calculation unit 53 using the generation cycle of the wheel speed pulse generated from the wheel speed sensors 31 to 34.

As described above, the vehicle speed control unit 55 selectively uses the drive motor 1 and the brake actuator 2 depending on whether the vehicle speed deviation (V*−V) is positive or negative by the PI (proportional and integral) control. When the vehicle speed deviation is zero or larger, the drive motor 1 is driven according to the driving torque command Tac* calculated using the proportional gain Kp_a and the integral gain Ki_a so that the vehicle speed V is increased by the driving force of the drive motor 1 to be close to the vehicle speed command V*. At this time, the hydraulic pressure command Pwc* for the brake actuator 2 is set to zero so as not to generate the braking force.

On the other hand, when the vehicle speed deviation is smaller than zero, the brake actuator 2 is driven according to the hydraulic pressure command Pwc* calculated using the proportional gain Kp_b and the integral gain Ki_b so that the vehicle speed V is decelerated by the braking force, generated by the brake controlled by the hydraulic pressure of the brake actuator 2, to be close to the vehicle speed command V*. At this time, the driving torque command Tac* for the drive motor 1 is set to zero so as not to generate the driving force.

[Steering Angle Control]

Figure 5:
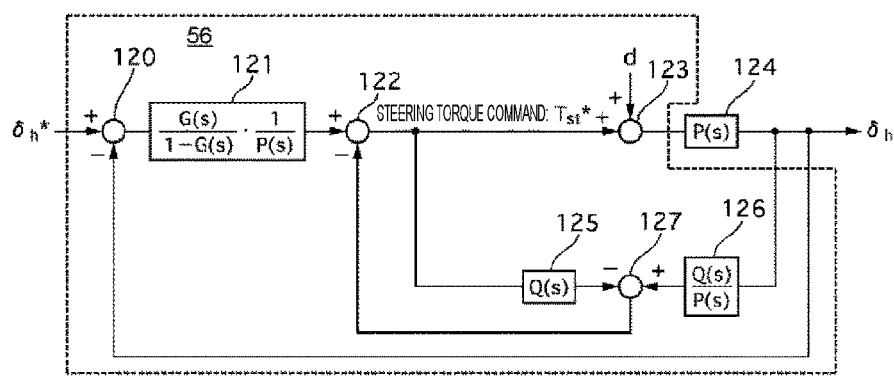
FIG. 5 is a configuration diagram of a steering angle control unit according to the embodiment.

FIG. 5 is a configuration diagram of the steering angle control unit according to the embodiment.

The steering angle control unit 56 is configured to perform two-degree-of-freedom control using a disturbance observer that cancels out a disturbance d, and can freely set a steering angle response by a target response G.

The steering angle control unit 56 includes a subtractor 120, a model matching compensator 121, a subtractor 122, an adder 123, a noise filter unit 125, an inverted plant model 126, and a subtractor 127.

The subtractor 120 outputs a steering angle deviation (δh*−δh) obtained by subtracting the steering angle δh (the steering angle δh input from the steering angle sensor 4) of a plant model (a vehicle model: the vehicle 200 herein) 124 from the steering angle command δh* input from the route control unit 54. The model matching compensator 121 is a feedback compensator that receives an input of the steering angle difference from the subtractor 120, and outputs an ideal steering torque to allow the steering angle response to match the desired target response G set in advance. The subtractor 122 outputs the steering torque command Tst* obtained by subtracting a disturbance estimation torque input from the subtractor 127 from the ideal steering torque input from the model matching compensator 121. The adder 123 adds the disturbance d to the steering torque command Tst* input from the subtractor 122 and outputs the result. The noise filter unit 125 filters the steering torque command Tst* with a low-pass filter and outputs the result. The inverted plant model 126 filters the steering angle δh output from the plant model 124 with the same low-pass filter with the low-pass filter of the noise filter unit 125 and outputs the result. The subtractor 127 subtracts the input value from the noise filter unit 125 from the input value from the inverted plant model 126 to output the disturbance estimation torque.

In the plant model 124, the steering motor 3 steers the steered wheels according to the steering torque command including the disturbance input from the adder 123, and the steering angle sensor 4 detects and outputs the steering angle δh.

[Configuration of Vehicle]

Figure 6:
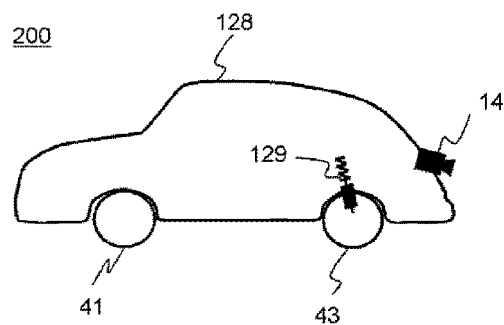
FIG. 6 is a view for describing a configuration of a vehicle according to the embodiment.

FIG. 6 is a view for describing a configuration of the vehicle according to the embodiment.

In the vehicle 200, the wheels 41 to 44 and the vehicle body 128 are connected via a suspension 129. The suspension 129 is constituted by, for example, a spring and an attenuator. Incidentally, the configuration between the wheels 41 to 44 and the vehicle body 128 is not limited thereto. Incidentally, it is possible to say that the wheels 41 to 44 and the vehicle body 128 are connected via a certain elastic body.

[Configuration of ECU Relating to Stop Cause Determination Process]

Figure 7:
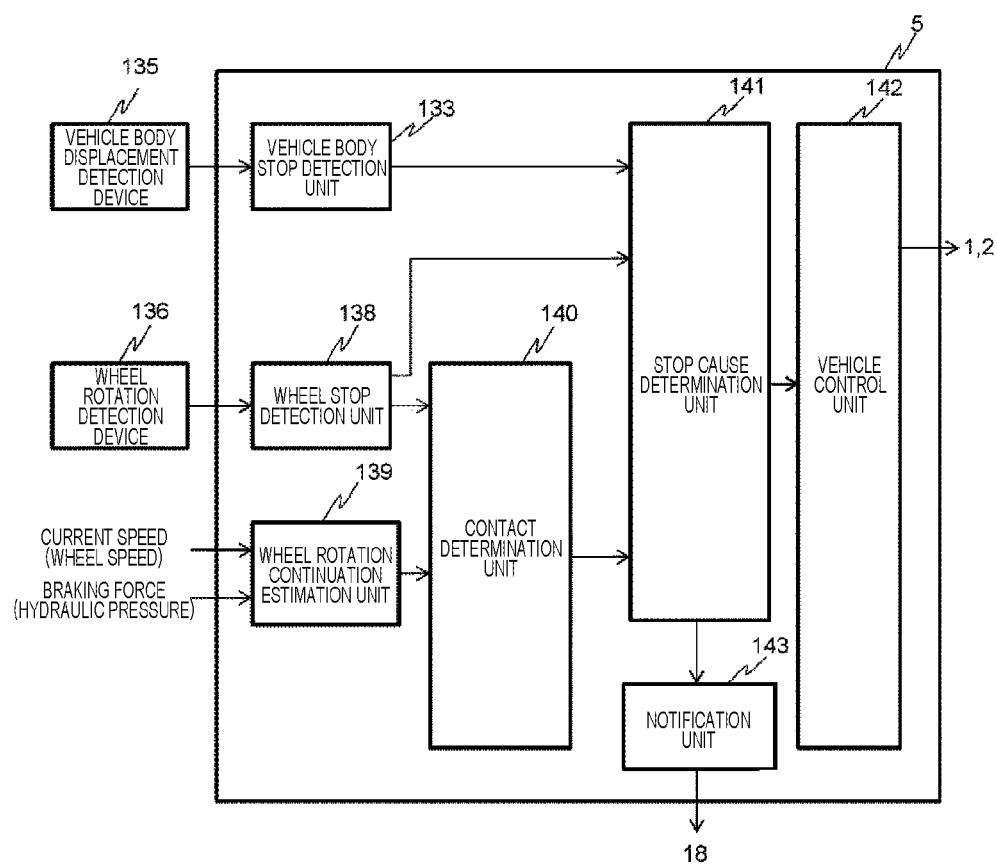
FIG. 7 is a functional configuration diagram of an ECU according to the embodiment.

FIG. 7 is a functional configuration diagram of the ECU according to the embodiment.

The ECU 5 includes a vehicle body stop detection unit 133, a wheel stop detection unit 138, a wheel rotation continuation estimation unit 139, a contact determination unit 140, a stop cause determination unit 141, a vehicle control unit 142, which is an example of a stop handling control unit and a vehicle stop structure determination unit, and a notification unit 143. The ECU 5 is connected to a vehicle body displacement detection device 135 and a wheel rotation detection device 136.

[Vehicle Body Displacement Detection Device]

The vehicle body displacement detection device 135 is a device that outputs displacement information by which it is possible to determine displacement of the vehicle body 128 of the vehicle 200. In the present embodiment, the vehicle body displacement detection device 135 is, for example, the cameras 11 to 14. Incidentally, the vehicle body displacement detection device 135, for example, may be a distance measurement sensor using electromagnetic waves such as sonar, laser, and infrared light. In short, any device that outputs information by which it is possible to determine whether the displacement of the vehicle body 128 is zero may be used.

Figure 8:
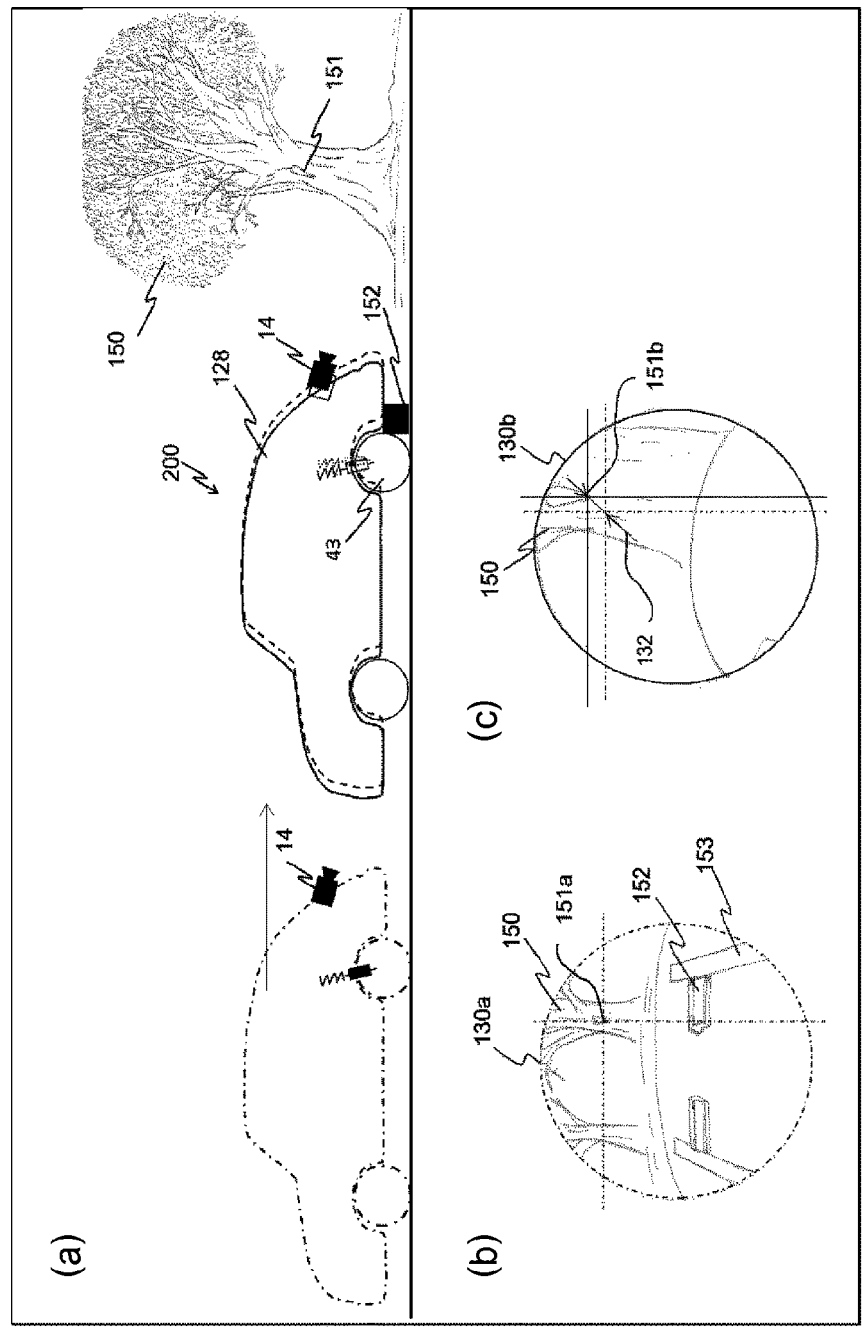
FIG. 8 is a view for describing a vehicle body displacement detection process performed by a vehicle body displacement detection device according to the embodiment.

FIG. 8 is a view for describing a vehicle body displacement detection process performed by the vehicle body displacement detection device according to the embodiment. FIG. 8 is a view for describing the vehicle body displacement detection process when the vehicle body displacement detection device 135 is the camera 14 installed on the rear side the vehicle 200. FIG. 8(*a*) illustrates a state where the vehicle 200 moves backward, FIG. 8(*b*) illustrates a video image of the camera 14 immediately after the vehicle 200 moves backward, and FIG. 8(*c*) illustrates a video image of the camera 14 when the vehicle stops.

Here, it is assumed that the vehicle 200 starts moving backward at a location where the tree 150 is present on the rear side and the wheel 43 comes into contact with a scotch 152 and stops as illustrated in FIG. 8(*a*). Here, a node 151 of this tree 150 is detected as a feature point in the video image.

First, when the vehicle 200 starts to move backward, the tree 150 behind the vehicle 200, the scotch 152 configured to stop the vehicle 200, and a white line 153 indicating a parking space are present in a video image 130*a* of the camera 14 as illustrated in FIG. 8(*b*). In the video image 130*a*, the node 151 of the tree 150 detected as the feature point is displayed at a position 151*a*.

On the other hand, when the vehicle 200 moves backward and the rear wheel (the wheel 43) of the vehicle 200 comes in contact with the scotch 152 and the vehicle 200 stops, the tree 150 behind the vehicle 200 is present in a video image 130*b* of the camera 14, but the scotch 152 is at a blind spot of the camera 14 and is not present as illustrated in FIG. 8(*c*). In the video image 130*b*, the node 151 of the tree 150 detected as the feature point is displayed at a position 151*b*.

Here, if focusing on the position of the node 151 which is the feature point in the video image when the vehicle 200 is moving backward, the position of the node 151 in the video image moves from the position 151*a* illustrated in FIG. 8(*b*) to the position 151*b* illustrated in FIG. 8(*c*) by a pixel displacement amount 132. In this manner, regarding the feature point in the video image, a position of a pixel to be displayed moves when the vehicle body 128 to which the camera 14 is fixed moves. Therefore, a displacement amount of a pixel position of a certain feature point can be used to determine whether the vehicle body 128 is moving or stopped. Therefore, in the present embodiment, the vehicle body displacement detection device 135 uses a certain feature point in the image of the same camera as a tracking point, and sequentially outputs information (the displacement amount) on the displacement of the pixel position of the tracking point.

[Vehicle Body Stop Detection Unit]

The vehicle body stop detection unit 133 determines whether the vehicle body 128 is stopped based on the displacement amount of the pixel position of the tracking point output from the vehicle body displacement detection device 135. In the present embodiment, the vehicle body stop detection unit 133 determines that the vehicle body 128 is stopped when no change is detected after a lapse of a predetermined time (a vehicle body stop detection threshold time) to determine the stop of the vehicle body 128 regarding the displacement amount output from the vehicle body displacement detection device 135. The vehicle body stop detection unit 133 outputs information (a signal) based on the determination result. Incidentally, the vehicle body stop detection unit 133 performs processing using digital information in the present embodiment.

Here, the vehicle body stop detection threshold time may be, for example, a time close to zero without being limited thereto, or a convergence time of vibration of the vehicle body 128 may be predicted based on the nature of the member, as the elastic body, between the wheels 41 to 44 and the vehicle body 128 and a time in the vicinity of the convergence time may be used.

Incidentally, a case where an output change of an output value of the vehicle body displacement detection device 135 does not completely become zero due to a matter that generates vibration inside the vehicle 200 or the like is likely to occur even if the vehicle 200 stops depending on the configuration of the vehicle 200. In order to cope with such a case, it may be determined that the vehicle body 128 is stopped, for example, when the output change of the output value has decreased to a predetermined value or smaller or when the vibration of the output change of the output value has converged within a predetermined vibration width.

In addition, the vehicle body stop detection unit 133 uses the output value of the vehicle body displacement detection device 135 directly for the processing in the above-described embodiment, but whether there is the output change may be determined using, for example, a value after performing filtering on the output value of the vehicle body displacement detection device 135 with a filter that can remove a sudden change in acceleration for elimination of influence of the matter that generates vibration in vehicle 200.

A vehicle body stop detection process performed by the vehicle body stop detection unit 133 will be described.

Figure 9:
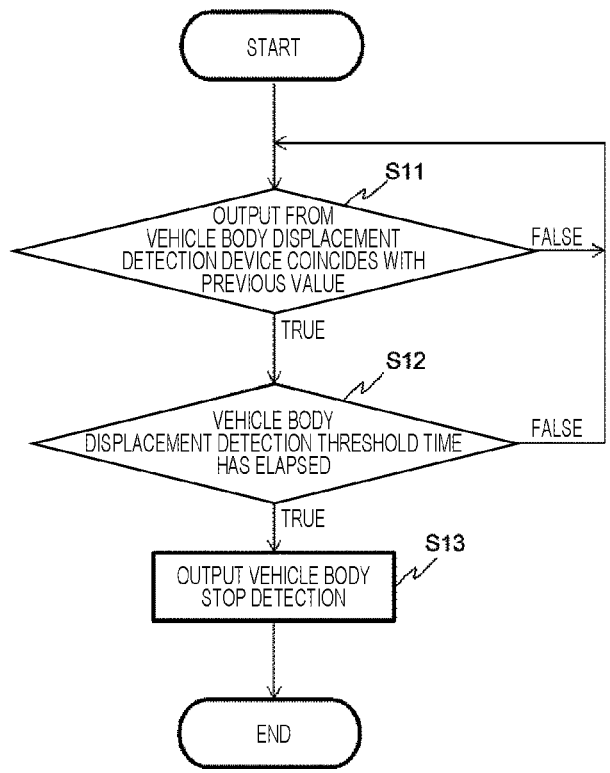
FIG. 9 is a flowchart of a vehicle body stop detection process according to the embodiment.

FIG. 9 is a flowchart of the vehicle body stop detection process according to the embodiment.

The vehicle body stop detection unit 133 determines whether the output value from the vehicle body displacement detection device 135 matches a previous value (Step S11). As a result, if it is determined as false (S11: false), the vehicle body 128 is not stopped, and thus, the vehicle body stop detection unit 133 advances the process to Step S11.

On the other hand, if the result of the determination is true (Step S11: true), there is a possibility that the vehicle body 128 is stopped, and thus, the vehicle body stop detection unit 133 determines whether the vehicle body displacement detection threshold time has elapsed since the output value matches the previous value (Step S12).

As a result, if it is determined as false (S12: false), it is difficult to confirm that the vehicle body 128 is stopped, and thus, the vehicle body stop detection unit 133 advances the process to Step S11.

On the other hand, if the determination result is true (Step S12: true), it means that the vehicle body 128 is stopped, and thus, the vehicle body stop detection unit 133 outputs information (vehicle body stop detection: the value "1", for example) indicating that the vehicle body 128 is stopped (Step S13), and ends the process. Incidentally, if the vehicle body 128 is not stopped, the output from the vehicle body stop detection unit 133 is information (vehicle body stop non-detection: the value "0") indicating that the vehicle body 128 is not stopped.

Next, a specific example of the vehicle body stop detection process performed by the vehicle body stop detection unit 133 will be described.

Figure 10:
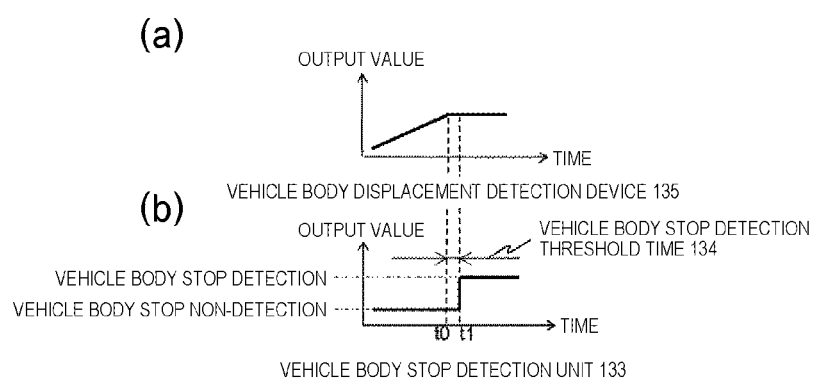
FIG. 10 is a graph for describing a specific example of a vehicle body stop detection process according to the embodiment.

FIG. 10 is a graph for describing the specific example of the vehicle body stop detection process according to the embodiment. FIG. 10(a) illustrates an output value of the vehicle body displacement detection device 135, and FIG. 10(b) illustrates output information of the vehicle body stop detection unit 133.

When the vehicle 200 starts to move backward, the output value from the vehicle body displacement detection device 135 is displaced along with the movement of the vehicle body 128, and becomes a constant value when the vehicle body 128 is stopped as illustrated in FIG. 10(a). In this case, the vehicle body stop detection unit 133 outputs the information (the value "0") indicating the vehicle body stop non-detection until the output value from the vehicle body displacement detection device 135 becomes the constant value at time t0 and time t1 has come after a lapse of the vehicle body stop detection threshold time 134, and outputs the information (the value "1") indicating the vehicle body stop detection after time t1 as illustrated in FIG. 10(b).

[Wheel Rotation Detection Device]

The wheel rotation detection device 136 may be any device as long as the device detects the wheel speed (rotation speed or displacement speed) of the wheels 41 to 44. In the present embodiment, the wheel rotation detection device 136 is, for example, the wheel speed sensors 31 to 34. The wheel speed sensors 31 to 34 may be, for example, encoders or resolvers.

[Wheel Stop Detection Unit]

The wheel stop detection unit 138 determines whether the wheels 41 to 44 are stopped based on the output value (for example, the wheel speed) of the wheel rotation detection device 136, and outputs information in response to the determination result. In the present embodiment, the wheel stop detection unit 138 determines that the wheels 41 to 44 are stopped when no change is detected in the output value even after a lapse of a predetermined time (wheel stop detection threshold time), which serves as a reference to determine that the wheel is stopped since the output value from the wheel rotation detection device 136 becomes zero, and outputs information (wheel stop detection (for example, "1")) indicating that the wheel is stopped. When the stop of the wheel is not detected, the wheel stop detection unit 138 outputs wheel stop non-detection (for example, "0"). Incidentally, the output value of the wheel rotation detection device 136 is used directly for processing in the above-described example, but it may be determined whether the change in the output value is detected after the output value becomes zero, for example, using a value after performing filtering on the output value with a filter that can remove a sudden change in acceleration for elimination of influence of the matter that generates vibration in vehicle 200.

Next, a wheel stop detection process performed by the wheel stop detection unit 138 will be described.

Figure 11:
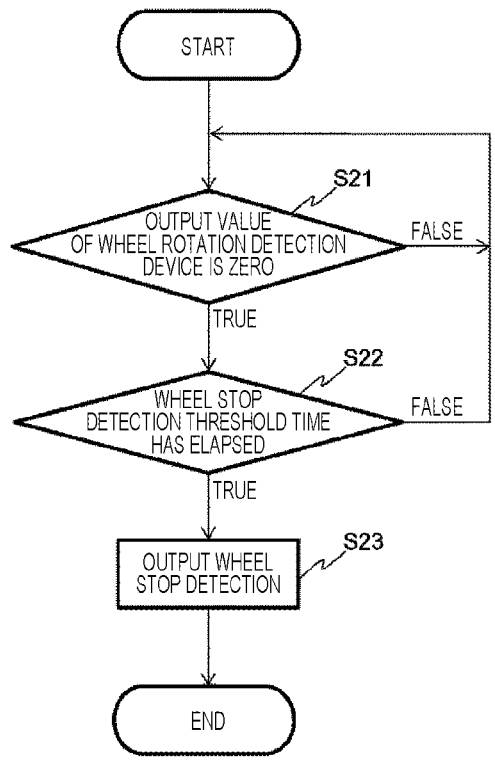
FIG. 11 is a flowchart of a wheel stop detection process according to the embodiment.

FIG. 11 is a flowchart of the wheel stop detection process according to the embodiment.

The wheel stop detection unit 138 determines whether the output value (wheel speed) from the wheel rotation detection device 136 has become zero (Step S21). As a result, if it is determined as false (Step S21: false), the wheels 41 to 44 are not stopped, and thus, the wheel stop detection unit 138 advances the process to Step S21.

On the other hand, if the result of the determination is true (Step S21: true), there is a possibility that the wheels 41 to 44 are stopped, and thus, the wheel stop detection unit 138 determines whether the wheel stop detection threshold time has elapsed since the output value becomes zero (Step S22).

If a result of the determination is false (Step S22: false), it is difficult to confirm that the wheels 41 to 44 are stopped, and thus, the wheel stop detection unit 138 advances the process to Step S21.

On the other hand, if the result of the determination is true (Step S22: true), it means that the wheels 41 to 44 are stopped, and thus, the wheel stop detection unit 138 outputs information (wheel stop detection) indicating that the stop of the wheels has been detected (Step S23), and ends the process.

[Wheel Rotation Continuation Estimation Unit]

The wheel rotation continuation estimation unit 139 calculates a wheel speed (estimated wheel speed) that can be realized by a braking force of the vehicle 200 at that time based on a latest wheel speed and information by which it is possible to identify the braking force of the vehicle 200. According to this estimated wheel speed, when the estimated wheel speed is higher than zero, it can be grasped that the wheels 41 to 44 continue to rotate only with the braking force of the vehicle 200. Examples of the information by which it is possible to identify the braking force of the vehicle 200 include a hydraulic pressure of brake oil to be supplied to the wheel cylinders 21 to 24 in the case of braking only with the brakes for each wheel and information for identifying a regenerative braking force of the drive motor 1 in the case of using the regenerative brake by the drive motor 1 in combination. Incidentally, the wheel rotation continuation estimation unit 139 may correct the estimated wheel speed using a road surface gradient on which the vehicle 200 is traveling, an estimated value of a road surface frictional force, or the like.

[Contact Determination Unit]

The contact determination unit 140 determines whether the vehicle 200 has been forcibly stopped due to contact with an obstacle or has been stopped by a braking force of the vehicle 200. Specifically, in the case where the vehicle body stop detection is output from the wheel stop detection unit 138, the contact determination unit 140 determines that the vehicle 200 has come into contact with an obstacle and outputs contact stop detection (for example, a value "1") indicating the stop due to contact with the obstacle when the estimated wheel speed higher than zero is output from the wheel rotation continuation estimation unit 139, and determines that the vehicle 200 has stopped without coming into contact with any obstacle and outputs contact stop non-detection (for example, a value "0") indicating that the stop without coming into contact with any obstacle when the estimated wheel speed equal to or lower than zero is output from the wheel rotation continuation estimation unit 139.

When the vehicle 200 is stopped by normal braking in the vehicle 200, the determination by the contact determination unit 140 is performed using the fact that the output of the wheel rotation continuation estimation unit 139 becomes zero or lower. When the output of the wheel rotation continuation estimation unit 139 is higher than zero, it is determined that the vehicle 200 has come into contact with a certain obstacle so that vehicle 200 has been forcibly stopped by receiving an external force due to the contact. Incidentally, the case where the vehicle 200 comes into contact with an obstacle and stops includes a case where the vehicle body 128 comes into contact with an obstacle and stops, and a case where any of the wheels 41 to 44 comes into contact with an obstacle and stops.

Next, a contact determination process performed by the contact determination unit 140 will be described.

Figure 12:
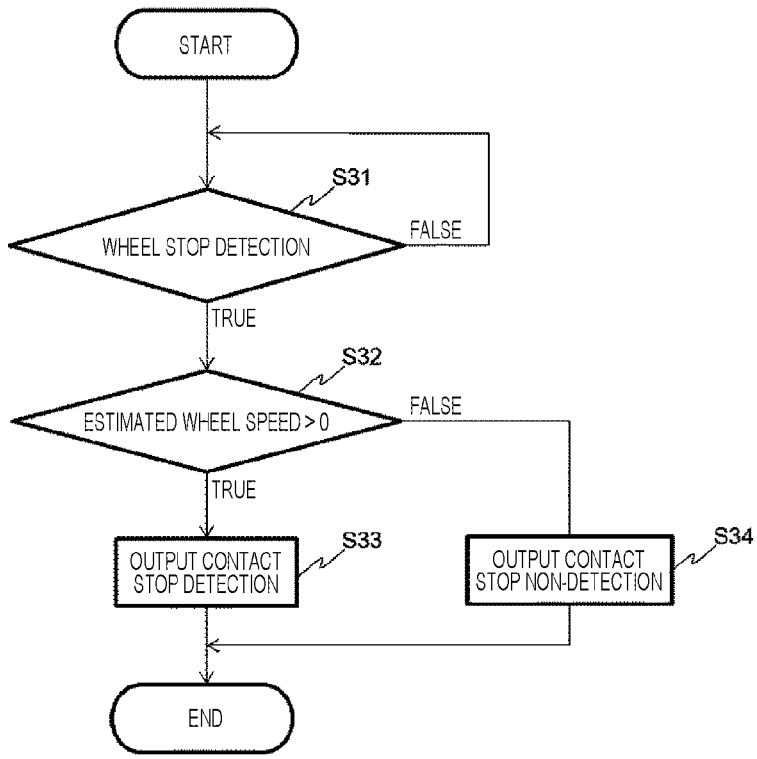
FIG. 12 is a flowchart of a contact determination process according to the embodiment.

FIG. 12 is a flowchart of the contact determination process according to the embodiment.

The contact determination unit 140 determines whether the output value from the wheel stop detection unit 138 is the wheel stop detection (Step S31). As a result, if it is determined as false (Step S31: false), the wheels 41 to 44 are not stopped, and thus, the contact determination unit 140 advances the process to Step S31.

On the other hand, if the result of the determination is true (Step S31: true), the wheels 41 to 44 are stopped, and thus, the contact determination unit 140 determines whether the estimated wheel speed output from the wheel rotation continuation estimation unit 139 is higher than zero (Step S32).

If the result of the determination is true (Step S32: true), it means that the vehicle 200 has stopped due to contact with the obstacle, and thus, the contact determination unit 140 outputs the contact stop detection (Step S33), and ends the process.

On the other hand, if the result of the determination is false (Step S32: false), it means that the vehicle 200 has stopped without coming into contact with any obstacle, and thus, the contact determination unit 140 outputs the contact stop non-detection (Step S34), and ends the process.

Next, specific examples of the contact determination process by performed the contact determination unit 140 will be described.

Figure 13:
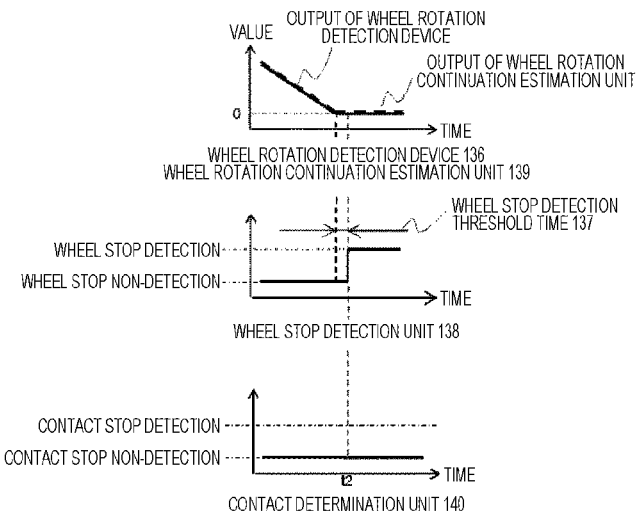
FIG. 13 is a graph for describing a specific example of the contact determination process when the vehicle according to the embodiment stops without coming into contact with any obstacle.

FIG. 13 is a graph for describing a specific example of the contact determination process when the vehicle according to the embodiment stops without coming into contact with any obstacle.

As illustrated in FIG. 13, if a state where the wheel speed output from the wheel rotation detection device 136 is zero is maintained until a wheel stop detection threshold time 137 elapses, the wheel stop detection unit 138 outputs the wheel stop detection. When the wheel stop detection is output from the wheel stop detection unit 138, the contact determination unit 140 determines whether the output of the wheel rotation continuation estimation unit 139 is higher than zero. Here, the vehicle 200 has stopped without coming into contact with any obstacle in the example of FIG. 13, and thus, the output of the wheel rotation continuation estimation unit 139 is zero at time t2 when the wheel stop detection is output. As a result, the contact determination unit 140 maintains the output of the contact stop non-detection indicating that the vehicle 200 has stopped without coming into contact with any obstacle.

Figure 14:
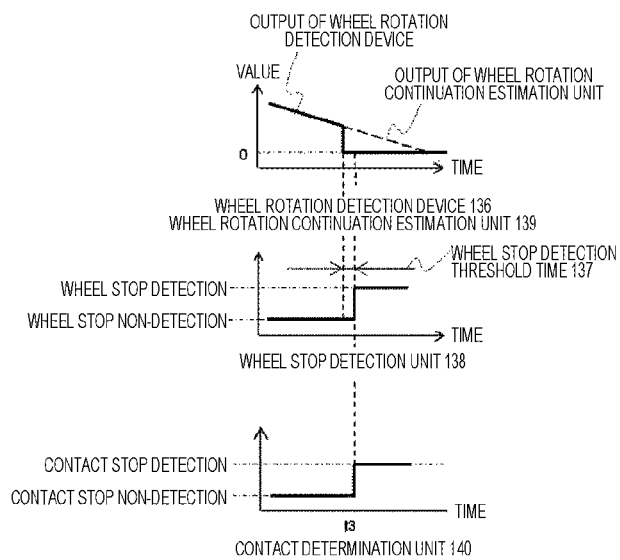
FIG. 14 is a graph for describing a specific example of the contact determination process when the vehicle according to the embodiment comes in contact with an obstacle and stops.

FIG. 14 is a graph for describing a specific example of the contact determination process when the vehicle according to the embodiment comes in contact with an obstacle and stops.

As illustrated in FIG. 14, if a state where the wheel speed output from the wheel rotation detection device 136 is zero is maintained until a wheel stop detection threshold time 137 elapses, the wheel stop detection unit 138 outputs the wheel stop detection. When the wheel stop detection is output from the wheel stop detection unit 138, the contact determination unit 140 determines whether the output of the wheel rotation continuation estimation unit 139 is higher than zero. Here, the vehicle 200 has come into contact with the obstacle and stopped in the example of FIG. 14, and thus, the output of the wheel rotation continuation estimation unit 139 is a value higher than zero at time t3 when the wheel stop detection is output. As a result, the contact determination unit 140 maintains the output of the contact stop detection indicating that the vehicle 200 has stopped due to contact with the obstacle.

[Stop Cause Determination Unit]

The stop cause determination unit 141 determines a stop cause of the vehicle 200 based on the outputs of the vehicle body stop detection unit 133, the wheel stop detection unit 138, and the contact determination unit 140, and outputs the determined stop cause to the vehicle control unit 142 and the notification unit 143.

Here, examples of the stop cause include whether the vehicle 200 has stopped due to contact with an obstacle or the vehicle has stopped without coming in contact with any obstacle, and whether the vehicle body 128 of the vehicle 200 has stopped due to contact with an obstacle or the wheels 41 to 44 of the vehicle 200 have stopped due to contact with the obstacle.

Here, a stop state and the stop cause in the vehicle 200 will be described.

Figure 15:
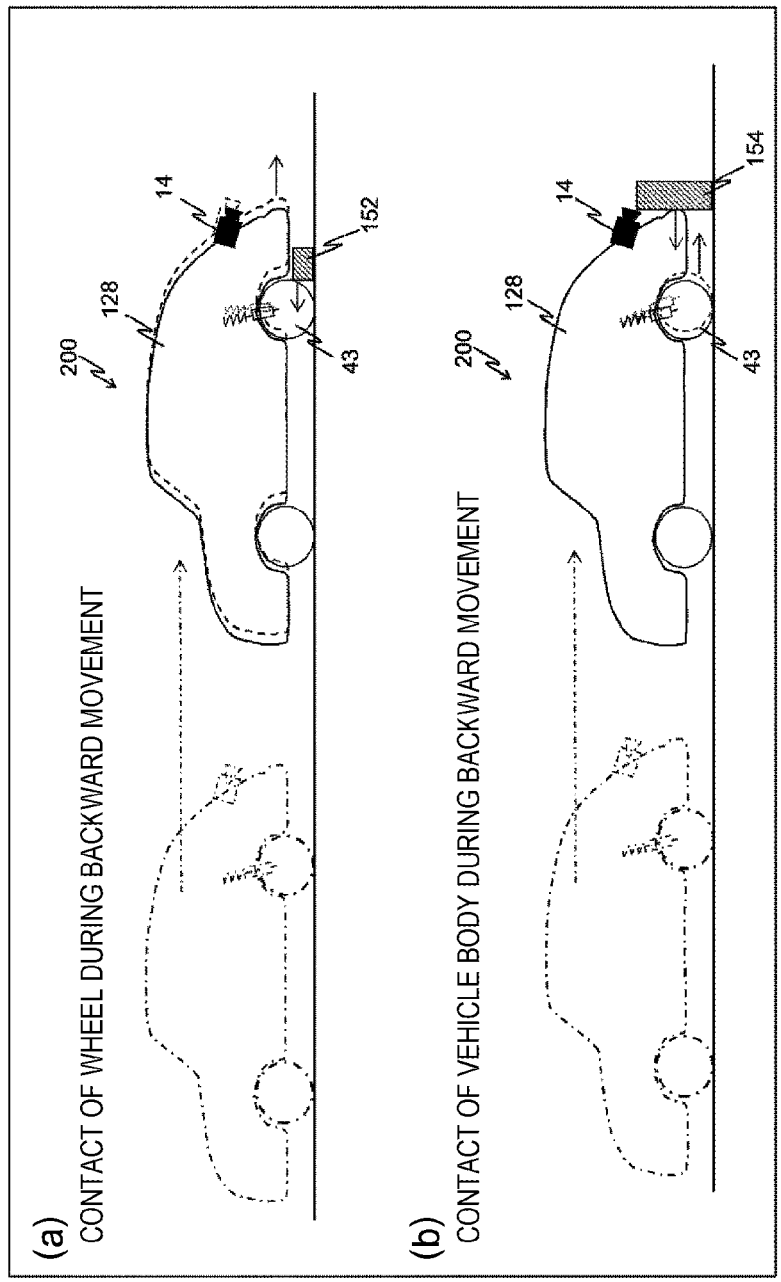
FIG. 15 is a view for describing a state at the time of contact of the vehicle according to the embodiment.

FIG. 15 is a view for describing a state of the vehicle according to the embodiment at the time of contact. FIG. 15(a) illustrates a situation where the vehicle 200 stops as the wheel 43 comes into contact with the scotch 152, which is an example of the obstacle, during backward movement, and FIG. 15(b) illustrates a situation where the vehicle 200 stops as the vehicle body 128 comes into contact with a wall 154, which is an example of the obstacle, during backward movement.

When the vehicle 200 stops due to contact of the wheel 43 with the scotch 152, that is, when the stop cause is the wheel contact, first, the wheel 43 is stopped by an external force of the scotch 152 as illustrated in FIG. 15(a). Here, the estimated wheel speed output from the wheel rotation continuation estimation unit 139 has a value higher than zero at a moment when the wheel 43 stops. Next, the vehicle body 128 which continues to move due to an inertial finally receives a reaction force from the elastic body (the suspension 129 or the like) of the vehicle 200, and eventually becomes stationary (stops).

In addition, when the vehicle 200 stops due to contact of the vehicle body 128 with the wall 154, that is, when the stop cause is the vehicle body contact, first, the vehicle body 128 is stopped by an external force from the wall 154, and then, the wheels 41 to 44 which continue to move due to an inertial force receive a reaction force from the elastic body (the suspension 129 or the like) of the vehicle 200, and eventually become stationary (stop) as illustrated in FIG. 15(b).

Incidentally, when the vehicle 200 stops without contact of either the vehicle body 128 or the wheels 41 to with the obstacle, that is, when the stop cause is normal stop (non-contact stop), first, the wheels 41 to 44 stop. Here, the estimated wheel speed output from the wheel rotation continuation estimation unit 139 is zero at a moment when the wheels 41 to 44 stop. Then, the vehicle body 128 which continues to move due to the inertial force receives the reaction force from the elastic body and eventually becomes stationary.

Next, a stop cause determination process performed by the stop cause determination unit 141 will be described.

Figure 16:
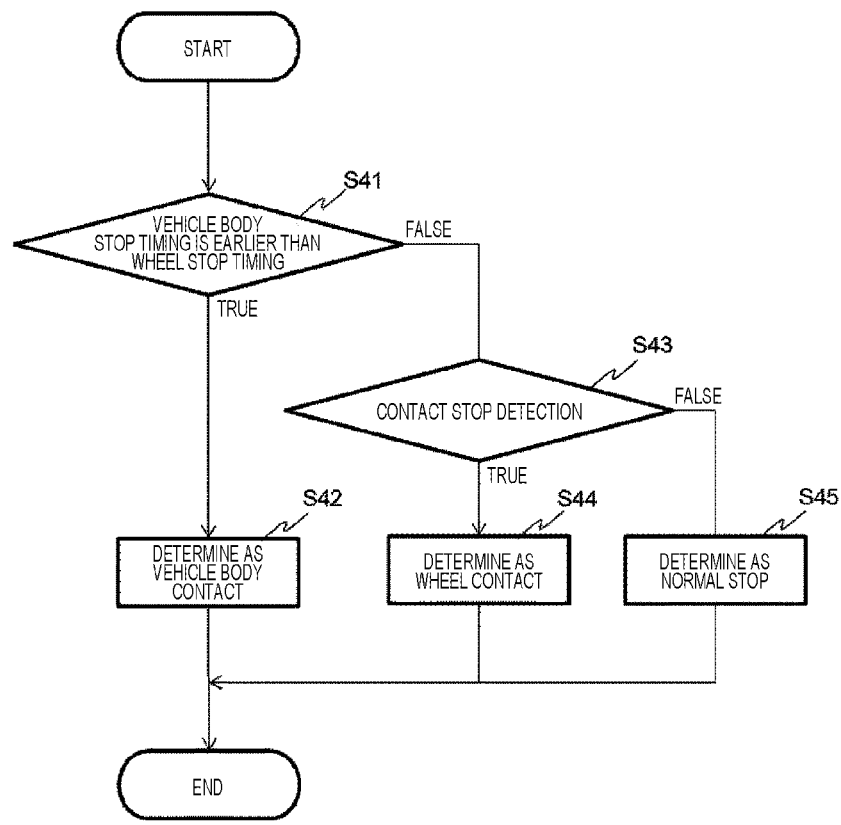
FIG. 16 is a flowchart of a stop cause determination process according to the embodiment.

FIG. 16 is a flowchart of the stop cause determination process according to the embodiment.

The stop cause determination process is performed, for example, immediately after the vehicle 200 stops.

First, the stop cause determination unit 141 determines whether a timing (vehicle body stop timing) at which the vehicle body stop detection unit 133 starts to output the vehicle body stop detection is earlier than a timing (wheel stop timing) at which the wheel stop detection unit 138 starts to output the wheel stop detection (Step S41).

As a result, if it is determined as true (Step S41: true), this result indicates that the vehicle body 128 has stopped due to contact with the obstacle, and thus, the stop cause determination unit 141 determines that the stop cause is the vehicle body contact, outputs the result to the vehicle control unit 142 and the notification unit 143 (Step S42), and ends the process.

On the other hand, when the result of the determination is false (Step S41: false), whether the contact stop detection is output from the contact determination unit 140 is determined (Step S43). As a result, if it is determined as true (Step S43: true), this result indicates that the vehicle 200 has stopped due to any of the wheels 41 to 44 coming into contact with the obstacle, and thus, the stop cause determination unit 141 determines that the stop cause is the wheel contact, outputs the result to the vehicle control unit 142 and the notification unit 143 (Step S44), and ends the process.

On the other hand, if it is determined as false (Step S43: false), this result indicates that none of the vehicle body 128 and the wheels 41 to 44 are in contact with any obstacle, and thus, the stop cause determination unit 141 determines that the stop cause is the normal stop, outputs the result to the vehicle control unit 142 and the notification unit 143 (Step S45), and ends the process.

Next, a specific example of the stop cause determination process performed by the stop cause determination unit 141 will be described.

Figure 17:
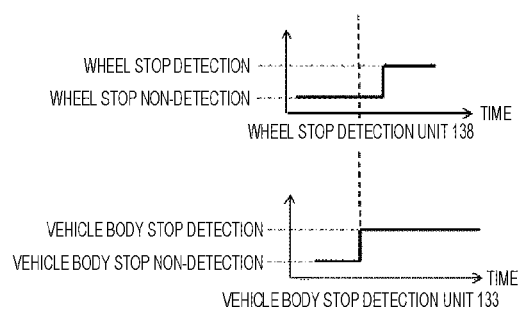
FIG. 17 is a view for describing a specific example of the stop cause determination process when a vehicle body of the vehicle according to the embodiment comes into contact with an obstacle and stops.

FIG. 17 is a graph for describing a specific example of the stop cause determination process when the vehicle body of the vehicle according to the embodiment comes in contact with an obstacle and stops.

When the vehicle body 128 of the vehicle 200 comes into contact with an obstacle and stops, the state as illustrated in FIG. 15(b) is generated, and thus, the timing (vehicle body stop timing) at which the vehicle body stop detection unit 133 starts to output the vehicle body stop detection is earlier than the timing (wheel stop timing) at which the wheel stop detection unit 138 starts to output the wheel stop detection as illustrated in FIG. 17. In this case, the stop cause determination unit 141 determines that the stop cause is the vehicle body contact in Step S42 through Step S41 in FIG. 16 and outputs the result to the vehicle control unit 142.

Figure 18:
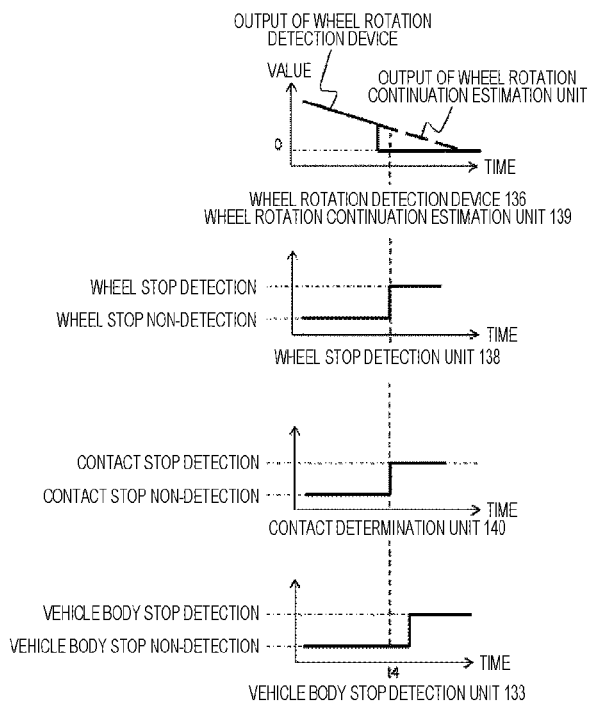
FIG. 18 is a graph for describing a specific example of the stop cause determination process when a wheel of the vehicle according to the embodiment comes in contact with an obstacle and stops.

FIG. 18 is a graph for describing a specific example of the stop cause determination process when the wheel of the vehicle according to the embodiment comes in contact with an obstacle and stops.

When any of the wheels 41 to 44 of the vehicle 200 comes into contact with an obstacle and the vehicle 200 stops, the state as illustrated in FIG. 15(a) is generated, and thus, the timing (wheel stop timing) at which the wheel stop detection unit 138 starts to output the wheel stop detection is earlier than the timing (vehicle body stop timing) at which the vehicle body stop detection unit 133 starts to output the vehicle body stop detection as illustrated in FIG. 18. In addition, the estimated wheel speed of the wheel rotation continuation estimation unit 139 is higher than zero at time t4 when the wheel stop detection is output, and thus, the contact determination unit 140 outputs the contact stop detection. As a result, the stop cause determination unit 141 determines that the stop cause is the wheel contact in Step S44 through Step S43 in FIG. 16 and outputs the result to the vehicle control unit 142.

Figure 19:
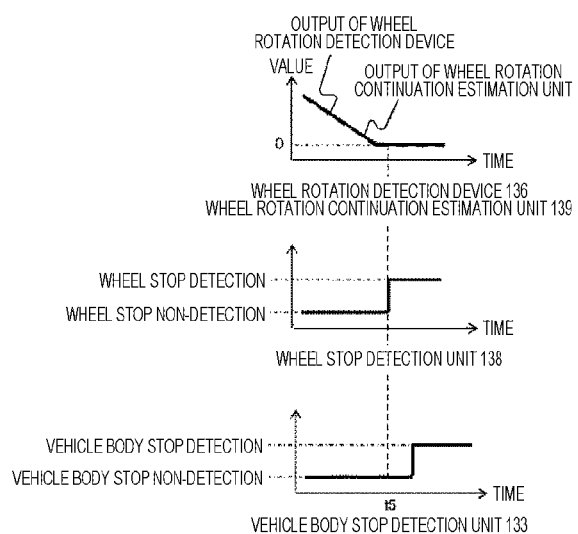
FIG. 19 is a graph for describing a specific example of the stop cause determination process when the vehicle according to the embodiment stops without contact of the vehicle body and the wheel with any obstacle

FIG. 19 is a graph for describing a specific example of the stop cause determination process when the vehicle according to the embodiment stops without contact of the vehicle body and the wheel with any obstacle.

When the vehicle 200 stops without contact of the vehicle body 128 and the wheels 41 to 44 with any obstacle, the timing (wheel stop timing) at which the wheel stop detection unit 138 starts to output the wheel stop detection is earlier than the timing (vehicle body stop timing) at which the vehicle body stop detection unit 133 starts to output the vehicle body stop detection as illustrated in FIG. 19. In addition, the estimated wheel speed of the wheel rotation continuation estimation unit 139 is zero at time t5 when the wheel stop detection is output, and thus, the contact determination unit 140 outputs the contact stop non-detection. As a result, the stop cause determination unit 141 determines that the stop cause is the normal stop in Step S45 through Step S43 in FIG. 16 and outputs the result to the vehicle control unit 142.

[Notification Unit]

The notification unit 143 receives the stop cause from the stop cause determination unit 141, and notifies the driver of information indicating the stop cause. For example, the notification unit 143 outputs the information indicating the stop cause to be displayed on the liquid crystal panel 18. As a result, the driver of the vehicle 200 can appropriately grasp the cause of the stop of the vehicle 200.

[Vehicle Control Unit]

The vehicle control unit 142 controls the vehicle 200 based on the stop cause determined by the stop cause determination unit 141. For example, when the stop cause is the vehicle body stop, the vehicle control unit 142 performs control (stop control) to stop the vehicle 200. The control to stop the vehicle 200 includes control to increase a hydraulic pressure of brake oil with the brake actuator 2 to improve a braking force, control to stop the drive motor 1, and the like.

In addition, when the stop cause is the wheel stop, the vehicle control unit 142 determines whether the obstacle is an obstacle configured to stop the vehicle 200 (a vehicle stop structure: the scotch 152, for example), and performs stop control to stop the vehicle 200 in the case of the obstacle configured to stop the vehicle 200, and performs movement control (for example, control to increase the driving force (driving torque) of the drive motor 1) to move the vehicle 200 beyond the obstacle in the case of not being the obstacle configured to stop the vehicle 200. Here, whether the obstacle is the obstacle configured to stop the vehicle 200 can be determined by performing a process of recognizing whether the vehicle stop structure is present in an image of the camera 14 during movement of the vehicle 200.

With the vehicle control device according to the embodiment described above, the following effects can be obtained.

For example, it is necessary to appropriately determine the stop cause in order to determine whether the vehicle 200 needs be controlled to stop or to travel, and this determination is performed based on an external world recognition device such as a camera and sonar and a result obtained by estimating a position of a vehicle in the related art.

In this determination, any information used for the determination may have an error in some cases, and it may be difficult for the vehicle and an obstacle to have an expected positional relationship due to an unpredictable disturbance in other cases. On the other hand, the stop cause of the vehicle 200 can be determined by simpler sensor values such as a distance and a pixel with the vehicle control device according to the present embodiment, and thus, the reliability is improved.

In addition, the stop cause of the vehicle 200 can be appropriately determined even if an obstacle is not directly detected by a sensor, with the vehicle control device according to the present embodiment. For example, when the vehicle 200 is moved to a parking space where a scotch is present, the scotch is located below the vehicle body at the time when the wheel reaches the vicinity of the scotch so that the scotch is present at a position of a blind spot from the camera mounted on the vehicle body. Even under such a situation, whether the wheel has come in contact with the scotch can be detected in the vehicle control device according to the present embodiment, and it is also possible to control the vehicle with high accuracy, such as immediately shifting to stop control when the contact with the wheel has been detected.

Incidentally, the present invention is not limited to the above-described embodiment, and can be appropriately modified and implemented within a range not departing from a spirit of the present invention.

For example, the suspension 129 of the vehicle 200 may be configured as an electronically controlled suspension whose damping force can be adjusted, and the vehicle control unit 142 may adjust the damping force of the suspension 129 when performing the movement control to move the vehicle 200 beyond the obstacle. For example, the vehicle control unit 142 may perform adjustment to decrease the damping force in order to improve transmission efficiency of the torque to the wheels, or to increase the damping force in order to provide comfortable feeling of ride to an occupant of the vehicle 200.

For example, the vehicle control unit 142 performs the stop control when the stop cause has been determined as the vehicle body contact in the above-described embodiment, but the present invention is not limited thereto. For example, a case where the vehicle 200 is controlled to perform predetermined movement after the vehicle 200 is once brought into contact with a predetermined obstacle is also conceivable, for example, depending on a type of vehicle 200 and a use mode of the vehicle 200. In such a case, the vehicle control unit 142 may perform predetermined control (for example, control to enhance the driving torque of the drive motor 1) different from the stop control from the time when it is determined that the stop cause is the vehicle body contact. In this manner, it is possible to make the contact of the obstacle with the vehicle body 128 cause the vehicle 200 to execute predetermined movement.

In addition, when the vehicle 200 moves backward, the displacement of the vehicle body 128 is detected based on the image of the camera 14 arranged on the rear part of the vehicle body 128 so as to capture a peripheral image on the rear side in the above-described embodiment, but the present invention is not limited thereto. In the present embodiment, a movement direction or a movement distance of the vehicle body 128 is not necessarily identified, and it is sufficient if whether the vehicle body 128 is displaced can be identified, and thus, the displacement of the vehicle body 128 may be detected based on an image of any one of the cameras 11 to 13 arranged to capture a peripheral image in another direction of the vehicle body 128.

In addition, the drive motor 1 is exemplified as the drive source in the above-described embodiment, but the present invention is not limited thereto. For example, the drive motor 1 may be replaced by an engine, and the engine may be provided in addition to the drive motor 1.

REFERENCE SIGNS LIST

1 drive motor
5 ECU
11 to 14 camera
41 to 44 wheel
128 vehicle body
129 suspension
133 vehicle body stop detection unit
135 vehicle body displacement detection device
136 wheel rotation detection device
138 wheel stop detection unit
139 wheel rotation continuation estimation unit
140 contact determination unit
141 stop cause determination unit
142 vehicle control unit
143 notification unit
200 vehicle

The invention claimed is:

1. A vehicle control device, which controls a vehicle comprising wheels, a vehicle body connected to the wheels, the vehicle control device comprising:
an electronic control unit configured to:
  detect a stop timing of the wheels;
  detect a stop timing of the vehicle body;
  determine that the stop timing of the wheels occurred prior to the stop timing of the vehicle body;
  determine, responsive to determining that the stop timing of the wheels occurred prior to the stop timing of the vehicle body, and based on an amount of braking force applied by the vehicle, that the vehicle has stopped due to contact between the wheels and an obstacle and not due to the amount of braking force; and
  determine, responsive to determining that the vehicle has stopped due to contact between the wheels and the obstacle, and based on the obstacle that the obstacle is not configured to stop the vehicle.

2. The vehicle control device of claim 1, wherein the electronic control unit is further configured to:
detect a second stop timing of the wheels;
detect a second stop timing of the vehicle body; and
determine that the vehicle has stopped due to a second contact between the vehicle body and a second obstacle when the second stop timing of the vehicle body occurs prior to the second stop timing of the wheels.

3. The vehicle control device of claim 2, wherein the electronic control unit is further configured to perform stop control to stop the vehicle when the vehicle has stopped the second contact between the vehicle body and the second obstacle.

4. The vehicle control device of claim 2, wherein the electronic control unit is further configured to:
estimate a rotation of the wheels at a predetermined time based on a braking force of the vehicle; and
determine that the vehicle has stopped due to the second contact between the vehicle body and the second obstacle based on the rotation of the wheels at the stop timing of the vehicle body.

5. The vehicle control device of claim 4, wherein the vehicle further comprises an imaging device that captures an image around the vehicle body, and the electronic control unit is further configured to:

determine, based on the second obstacle as represented in the image captured by the imaging device, that the second obstacle is a vehicle stop structure; and perform stop control to stop the vehicle responsive to determining that the second obstacle is the vehicle stop structure.

6. The vehicle control device of claim 1, wherein the wheels and the vehicle body are connected via an electronically controlled suspension capable of controlling a damping force, and wherein the electronic control unit is further configured to adjust the damping force of the electronically controlled suspension when increasing a driving torque of a drive motor of the vehicle to enhance the driving torque of the vehicle.

7. The vehicle control device of claim 1, wherein the vehicle further comprises an imaging device that captures an image around the vehicle body, and the electronic control unit is further configured to determine the stop timing of the vehicle body further based on a position of a predetermined feature point in the image captured by the imaging device.

8. The vehicle control device of claim 1, wherein the electronic control unit is further configured to indicate, on a liquid crystal display of the vehicle, that the vehicle has stopped due to contact between the wheels and the obstacle and not due to the amount of braking force.

9. A vehicle control method performed by a vehicle control device, which controls a vehicle comprising wheels, a vehicle body connected to the wheels, the vehicle control method comprising:

detecting a stop timing of the wheels;

detecting a stop timing of the vehicle body;

determining that the stop timing of the wheels occurred prior to the stop timing of the vehicle body;

determining, responsive to determining that the stop timing of the wheels occurred prior to the stop timing of the vehicle body, and based on an amount of braking force applied by the vehicle, that the vehicle has stopped due to contact between the wheels and an obstacle and not due to the amount of braking force; and determining, responsive to determining that the vehicle has stopped due to contact between the wheels and the obstacle, that the obstacle is not configured to stop the vehicle.

10. The vehicle control device of claim 1, wherein the electronic control unit is further configured to increase a driving torque of a drive motor of the vehicle to move the vehicle beyond the obstacle responsive to determining that the obstacle is not configured to stop the vehicle.

11. The vehicle control method of claim 9, further comprising increasing a driving torque of a drive motor of the vehicle to move the vehicle beyond the obstacle responsive to determining that the obstacle is not configured to stop the vehicle.

* * * * *